H. N. DALTON.
SPRING FOR GANG PLOWS.
No. 95,437. Patented Oct. 5, 1869.
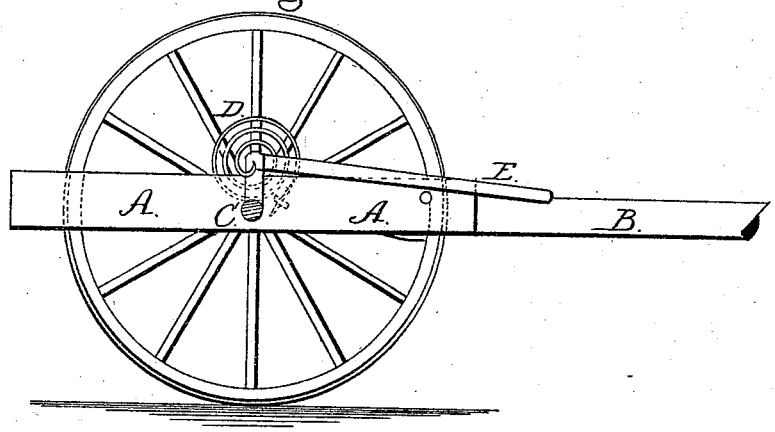
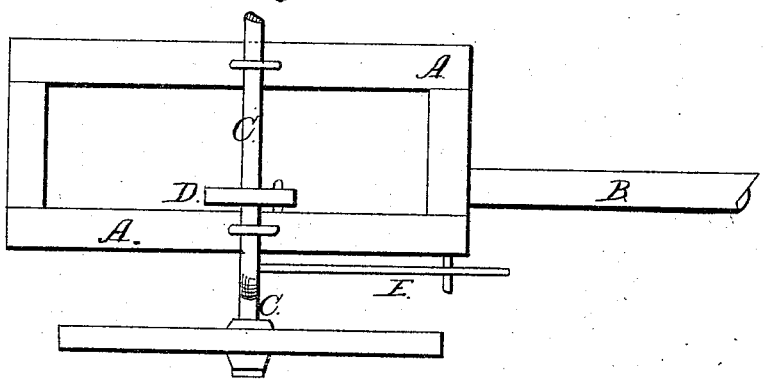
Witnesses:
Jn. Becker
Geo. W. Mabee
Inventor:
H. N. Dalton
Munn & Co
Attorneys

United States Patent Office.

H. N. DALTON, OF PACHECO, CALIFORNIA.

Letters Patent No. 95,437, dated October 5, 1869.

IMPROVEMENT IN SPRING FOR GANG-PLOWS.

The Schedule referred to in these Letters Patent and making part of the same.

To all whom it may concern:

Be it known that I, H. N. DALTON, of Pacheco, in the county of Contra Costa, and State of California, have invented a new and useful Improvement in Gang-Plows; and I do hereby declare that the following is a full, clear, and exact description thereof, which will enable others skilled in the art to make and use the same, reference being had to the accompanying drawing, forming part of this specification, in which—

Figure 1 represents my improvement as attached to the frame and axle of a gang-plow.

Figure 2 is a top view of the same.

Similar letters of reference indicate corresponding parts.

My invention has for its object to improve the construction of gang-plows, in such a way that the gang-plow may be raised while running to cut a light furrow, or to lift it entirely from the ground, at the will of the operator, and which shall at the same time be simple in construction and readily applied and operated; and It consists in the application of a coiled or other spring to the axle and frame of the gang-plow, as hereinafter more fully described.

A, in the drawing, represents the frame of the machine, to which the plows are attached in the ordinary manner.

B represents the tongue of the machine, to which the draught is applied.

C represents the axle of the machine, upon the journals of which the wheels revolve in the ordinary manner. The axle C is a crank-axle, and works in bearings attached to the frame A.

D is a spring, one end of which is attached to the axle C, around which it is coiled, and the other end of which is attached to tl frame A.

The spring D shoul be so arranged that when released, its elasticity m revolve the axle C in such a direction as to raise the frame A, and with it the plows, more or less, according to the space through which the said axle is allowed to revolve.

The movement of the axle C may be controlled by a lever, E, attached to it, and held in any desired position by stops or catches attached to or connected with the frame A, or with supports attached to said frame.

Having thus described my invention,

What I claim as new, and desire to secure by Letters Patent, is—

The combination of a coiled or other spring with the axle and frame of a gang-plow, substantially as herein shown and described, and for the purpose set forth.

H. N. DALTON.

Witnesses:
  G. A. HUFFNER,
  S. W. STARK.